United States Patent [19]
Bruce, Jr. William H. et al.

[11] Patent Number: 4,891,667
[45] Date of Patent: Jan. 2, 1990

[54] DOCUMENT PLATEN FOR ELECTROSTATOGRAPHIC REPRODUCTION APPARATUS

[75] Inventors: Bruce, Jr. William H., Walworth; Gary A. Porter, Webster, both of N.Y.

[73] Assignee: Eastman Kodak Company, Rochester, N.Y.

[21] Appl. No.: 233,510

[22] Filed: Aug. 18, 1988

[51] Int. Cl.$^4$ ............................................. G03G 21/00
[52] U.S. Cl. ........................................ 355/230; 355/75
[58] Field of Search ........................ 355/75, 76, 3 SH; 211/45; 353/DIG. 5, 120; 33/613–623; 269/303, 315, 291; 352/232; 206/455; 358/497

[56] References Cited

U.S. PATENT DOCUMENTS

| | | | |
|---|---|---|---|
| 4,072,418 | 2/1978 | Fujizuka | 355/75 |
| 4,190,358 | 2/1980 | Sasuga | 355/75 |
| 4,551,014 | 11/1985 | Nakatomi et al. | 355/75 |

FOREIGN PATENT DOCUMENTS 0153963  9/1983  Japan ........................................ 355/75

Primary Examiner—A. T. Grimley
Assistant Examiner—Robert Beatty
Attorney, Agent, or Firm—Lawrence P. Kessler

[57] ABSTRACT

A document platen for an electrostatographic reproduction apparatus which facilitates proper location of a document to be reproduced by such apparatus. In an electrostatographic reproduction apparatus having a planar member and a transparent member adapted to support a document to be reproduced by the apparatus, the planar member includes an opening defined in the planar member. Three corners of the opening have a rounded configuration and one corner defines a right angle. The transparent member is attached to the underside of the planar member so that the transparent member completely spans the opening. The right angle corner serves to direct an operator to properly place a document to be reproduced on the transparent member.

6 Claims, 1 Drawing Sheet

DOCUMENT PLATEN FOR ELECTROSTATOGRAPHIC REPRODUCTION APPARATUS

BACKGROUND OF THE INVENTION

This invention is directed in general to document platens for electrostatographic reproduction apparatus, and more particularly to a document platen having features which assist in the placement of a document on a platen so as to assure proper registration of the reproduction electrostatographically formed on a receiver sheet.

In typical electrostatographic reproduction apparatus for reproducing information from a document, the document to be reproduced is placed on a support platen and subjected to light from an illumination source to form an image thereof. A lens assembly focuses the light image on a uniformly charged photoconductive member to expose the member whereby the charge pattern is altered and a corresponding latent image charge pattern is formed on the member. Alternatively, the image may be converted to electrical signals for driving a laser or light element array to expose the uniformly charged photoconductive member, or electrostatically alter the charge pattern on a dielectric member.

Pigmented marking particles are brought into contact with the photoconductive (dielectric) member and attracted to the latent image charge pattern to develop such image on the member. The member is then brought into registered contact with a receiver member and an electrostatic field applied to transfer the marking particle developed image to the receiver sheet from the member. After transfer, the receiver sheet bearing the transferred image is transported away from the photoconductive member, and the image is fixed to the receiver sheet by heat and/or pressure to form a permanent reproduction thereon.

Assuming that all of the components of the reproduction apparatus are properly operatively related and functioning in the proper timed sequence, the orientation of the reproduced information of a document on a receiver sheet is dependent upon the location of the document on the document-supporting platen. However, proper placement of the document on the platen by a casual operator is not a trivial matter. The wide variety of electrostatographic reproduction apparatus available today have a number of different relative locations for placement of a document on the respective platens in order to achieve proper registration of the reproduction made thereby. Particularly, a document may be registered on the platen at any corner or edge, and the document may be placed on the platen with its major dimension lying from front to back or from side to side relative to the reproduction apparatus. In order to lessen operator confusion as to where to place the document on the platen, some reproduction apparatus employ indicia located adjacent to the platen. However, such indicia must be correctly located initially to assure document registration, and are subject to damage or removal.

SUMMARY OF THE INVENTION

This invention is directed to a document platen for an electrostatographic reproduction apparatus which facilitates proper location thereon of a document to be reproduced by such apparatus. In an electrostatographic reproduction apparatus having a planar member and a transparent member adapted to support a document to be reproduced by the apparatus, the planar member includes an opening defined in the planar member. Three corners of the opening have a rounded configuration and one corner defines a right angle. The transparent member is attached to the underside of the planar member so that the transparent member completely spans the opening. The right angle corner serves to direct an operator to properly place a document to be reproduced on the transparent member.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
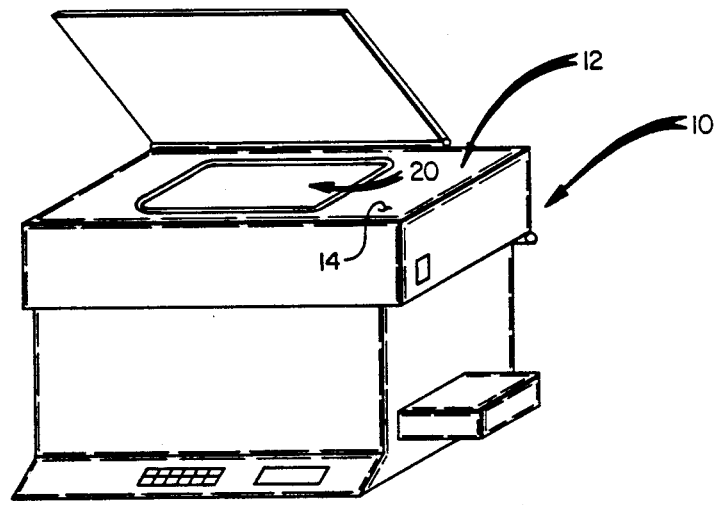
FIG. 1 is a view, in perspective, of an exemplary electrostatographic apparatus including a location facilitating document platen according to this invention.

Referring now to the accompanying drawings, FIG. 1 shows an electrostatographic reproduction apparatus, designated generally by the numeral 10. The apparatus 10 is, for example, a reproduction apparatus of the type shown and fully described in the copending U.S. patent application Ser. No. 081,765, filed Aug. 5, 1988, now U.S. Pat. No. 4,803,517, in the name of William H. Bruce, Jr. In the apparatus of this application, a document supported on a platen is illuminated by a travelling light source, and the reflected light image of the document is focused, line-by-line, by a lens assembly on a uniformly charged photoconductive member. The focused light image alters the uniform charge to form an image-wise corresponding charge pattern on the photoconductive member. The charge pattern is developed with pigmented marking particles which are subsequently transferred to a receiver sheet and fused thereto to form the reproduction of the document. The location of the lens assembly relative to the platen and the photoconductive member is particularly set so that when a document is at a predetermined location on the platen, the image developed on the photoconductive member is in proper position for registered transfer to the receiver sheet. Of course, other reproduction apparatus such as an apparatus wherein a light image of a document to be reproduced in converted to electrical signals for driving a laser or light element array to expose the uniformly charged photoconductive member, or electrostatically alter the charge pattern on a dielectric member are suitable for use with this invention. Additionally, this invention may be used with an apparatus where the light image of a document is converted to electrical signals for transmission to a remote recording device.

Figure 2:
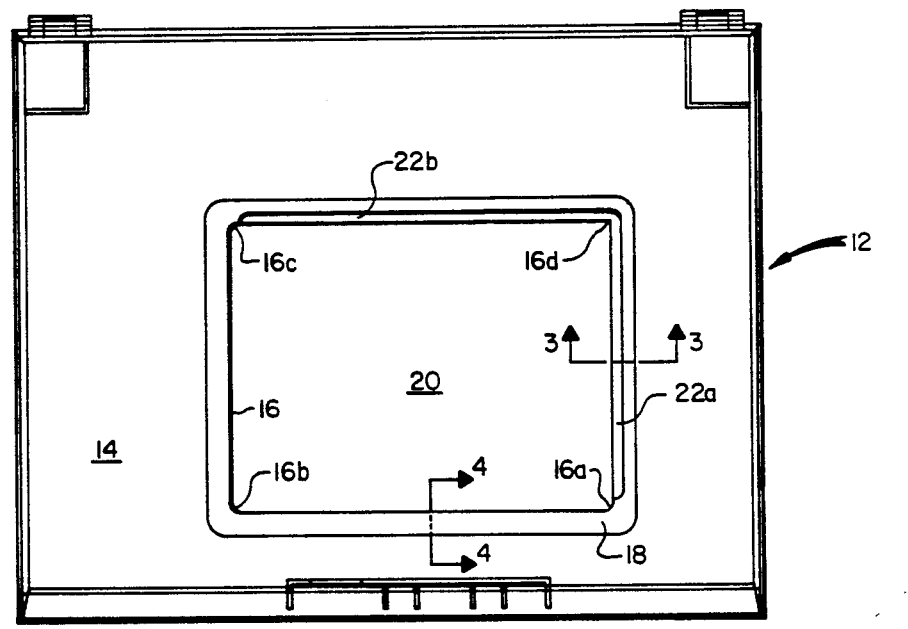
FIG. 2 is a top plan view of the location facilitating document platen of FIG. 1.
Figure 3:
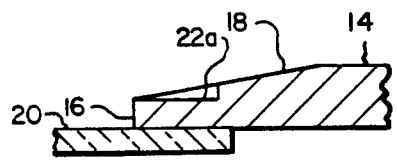
FIG. 3 is a cross-sectional view of a portion of the location facilitating document platen taken along lines 3—3 of FIG. 2.
Figure 4:
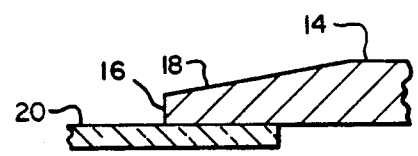
FIG. 4 is a cross-sectional view of a portion of the location facilitating document platen taken along lines 4—4 of FIG. 2.

The reproduction apparatus 10 includes a platen 12 for facilitating location of a document thereon, according to this invention. As best shown in FIGS. 2-4, the document platen 12 has a substantially planar member 14 forming the upper portion of the reproduction apparatus housing. The planar member 14 has a substantially rectangular opening 16 defined therein. A transparent member 20 is fixed to the underside of the planar member 14 (see FIGS. 3 and 4) in any well known manner so as to completely span the opening 16. As such the transparent member 20 forms a surface for supporting a document to be reproduced by the apparatus 10. The marginal edges of the planar member 14 surrounding the opening 16 are formed as a bezel 18 so as to guide the casual operator to the transparent member 20, with the rectangular shape of the opening suggesting the desired orientation of the document to be placed on the transparent member for reproduction.

Three of the corners of the opening 16, designated by the numerals 16a, 16b, and 16c, are generously rounded. The remaining corner, designated by the numeral 16d, defines a right angle. When the platen 12 is viewed by the casual operator, the right angle of the corner 16d of the planar member 14 makes it readily apparent that such corner is the proper location for positioning the corner of the document to be reproduced by the apparatus 10. The marginal edges of the planar member 14 adjacent to the right angle corner 16d forming the bezel 18 have recesses 22a and 22b respectively formed therein. The recesses 22a and 22b are adapted to receive indicia for further indicating the proper location of a document placed on the transparent member 20 for reproduction by the apparatus 10. Such indicia may be permanently inscribed in the recesses so that it is located properly with respect to the transparent member 20 and cannot be removed or damaged. With a document corner located in the corner 16d in engagement with the adjacent marginal edges of the opening 16, the light image of the document will be focuses in the proper location on the photoconductor so that the developed image produced therefrom is transferred to a receiver sheet in proper registration.

The invention has been described in detail with particular reference to a preferred embodiment thereof, but it will be understood that variations and modifications can be effected within the spirit and scope of the invention.

We claim:

1. In an electrostatographic reproduction apparatus having a document supporting platen including a planar member and a transparent member adapted to support a document to be reproduced by said apparatus, means for facilitating location of a document on said platen, said means comprising:
    an opening defined in said planar member, three corners of said opening having a generously rounded configuration, and one corner defining a right angle; and said transparent member being attached to the underside of said planar member so that said transparent member completely spans said opening.

2. The invention of claim 1 wherein the portions of said planar member defining said opening include a bezel.

3. The invention of claim 2 wherein portions of said bezel forming said right angle corner of said opening respectively include a recess adapted to receive indicia for aiding in document registration.

4. A document supporting platen for an electrostatographic apparatus, said platen comprising:
    a transparent member; and a planar member having an opening defined in such planar member, three corners of said opening having a generously rounded configuration and one corner defining a right angle, said transparent member being attached to the underside of said planar member so that said transparent member completely spans said opening, whereby a document can be supported on said transparent member and said right angle corner of said opening facilitates proper location of the document on such transparent member.

5. The invention of claim 4 wherein the portions of said planar member defining said opening include a bezel.

6. The invention of claim 5 wherein portions of said bezel forming said right angle corner of said opening respectively include a recess adapted to receive indicia for aiding in document registration.

* * * * *